United States Patent [19]

Elmquist et al.

[11] Patent Number: 4,655,943

[45] Date of Patent: Apr. 7, 1987

[54] THICKENERS HAVING TWO IONIC COMPONENTS AND USE THEREOF IN AQUEOUS COMPOSITIONS

[75] Inventors: Lyle F. Elmquist, St. Paul; Warren W. Howland, Champlin; Curtis L. Karl, Minneapolis, all of Minn.

[73] Assignee: Henkel Corporation, Minneapolis, Minn.

[21] Appl. No.: 681,530

[22] Filed: Dec. 14, 1984

[51] Int. Cl.$^4$ .................... E21B 43/26; C08F 8/42
[52] U.S. Cl. .................... 252/8.551; 166/308; 252/8.553; 406/48; 525/360; 525/370; 525/371
[58] Field of Search ......... 252/8.5 C, 8.55 R, 8.55 C; 524/547; 525/328.2, 370, 371, 372, 360; 166/308, 294

[56] References Cited

U.S. PATENT DOCUMENTS 4,498,539 2/1985 Bruning .................... 166/294

Primary Examiner—Herbert B. Guynn
Attorney, Agent, or Firm—Ernest G. Szoke; Patrick J. Span; John Daniel Wood

[57] ABSTRACT

A thickener composition is comprised of a polymer having as the major recurring structural unit an acrylamidoalkanesulfonic acid or derivative thereof and a polyvalent metal crosslinking agent is provided. The compositions are useful for thickening aqueous solutions within a specified range of pH. The thickener is effective even in aqueous compositions having high levels of electrolytes.

19 Claims, No Drawings

THICKENERS HAVING TWO IONIC COMPONENTS AND USE THEREOF IN AQUEOUS COMPOSITIONS

FIELD OF THE INVENTION

This invention relates to thickener compositions comprised of two ionic components. More particularly, this invention relates to a composition comprised of a poly(acrylamidoalkanesulfonic acid) or derivative thereof and a polyvalent metal crosslinking agent. This composition is useful for thickening aqueous compositions.

BACKGROUND OF THE INVENTION

U.S. Pat. No. 3,502,149 to Pence discloses that a crosslinked polymeric composition useful as a plugging and sealing agent can be prepared from the mixture of (A) a water soluble or colloid forming polymer from the class consisting of polyacrylamides, polyacrylates, polyacrylic acids, mixtures of acrylates and acids, and sulfonated derivatives thereof; (B) a polyhydric compound whereby a reducing agent in said solution is provided; (C) water; and (D) an oxidizing agent selected from the class consisting of water soluble chromates and dichromates consisting of a solution-soluble hexavalent chromium compound, which yields nascent chromium in situ having a valence state of +3, which crosslink the water-dispersible polymer. The patent discloses that some advantages are obtained when the pH value of the fluid composition is on the acid side such that pH value thereof should be lowered to a value of from 4 to 6 by the addition of acid salts such as aluminum chloride, ferric chloride or calcium chloride, or by the addition of an acid, e.g. hydrochloric or sulfuric acid.

U.S. Pat. No. 3,692,673 to Hoke discloses that polymers of acrylamidosulfonic acids and their salts, especially 2-acrylamido-2-methylpropanesulfonic acid and its salts, are useful as flocculants for aqueous systems, especially in combination with inorganic co-flocculants. The amount of the polymer added to the suspension being flocculated ranges from about 0.01 to about 10 parts per million. The inorganic co-flocculants include ferric sulfate, aluminum sulfate, calcium hydroxide or the like in an amount from about 1 to about 250 parts per million.

U.S. Pat. No. 4,107,057 to Dill, et al. discloses that a well acidizing or fracturing composition is prepared by adding to an aqueous acid solution or emulsion or fracturing composition, a cross-linked copolymer of a sulfonic acid-modified acrylamide or a polyvinyl cross-linking agent. The cross-linked copolymer functions as an effective fluid loss additive and/or diverting agent. From about 25 pounds to about 100 pounds of the additive is utilized per 1000 gallons of the aqueous acid solution or acid emulsion.

U.S. Pat. No. 3,444,037 to Armour discloses an adhesive composition capable of yielding dry films characterized by their optimum water resistance; said composition comprising a mixture of vinyl acetate polymer emulsion, a sulfonated B-stage phenolic resin and an acidic, metal salt curing agent. The preferred curing agents are described as metal salts selected from the group consisting of chromic nitrate, chromic perchlorate, aluminum nitrate and aluminum chloride.

SUMMARY OF THE INVENTION

This invention relates to a thickener having two ionic components comprising (a) a polymer of an acrylamidoalkanesulfonic acid or a salt thereof and (b) a polyvalent metal crosslinking agent. More particularly, this invention relates to a thickener useful in thickening aqueous compositions comprising:

(a) a polymer having as the major recurring structural unit:

—(CH$_2$—CH(C(O)NH—R—SO$_3$M))— wherein R is a divalent hydrocarbon radical and M is a hydrogen atom, an ammonium group, or an alkali metal atom; and (b) a polyvalent metal crosslinking agent.

This invention also relates to methods of thickening an aqueous composition and to aqueous compositions containing the two component thickener described above.

DETAILED DESCRIPTION OF THE INVENTION

As used herein, the terms aqueous composition and aqueous solution shall be used to refer to compositions comprised of water alone and mixtures of water and alcohol. Examples of alcoholic aqueous compositions include mixtures of water and the lower alkanols, e.g. methanol, ethanol, n-propanol, isopropanol, etc. and mixtures of water and polyols, e.g. ethylene glycol, propylene glycol, glycerol, etc.

One of the components of the thickener composition of this invention is a polymer wherein the major recurring structural unit is derived from an acrylamidoalkanesulfonic acid or a salt thereof. These polymers are generally described in U.S. Pat. No. 3,692,673, which is incorporated herein by reference thereto. The preferred polymer is obtained by polymerizing a monomer mixture that is at least about 50% by weight of 2-acrylamido-2-methylpropanesulfonic acid or a salt thereof. The most preferred polymers are homopolymers of 2-acrylamido-2-methylpropanesulfonic acid or a salt thereof.

The polymer is preferably prepared by means which will provide a polymer having a molecular weight between about 50,000 and about 5,000,000. The molecular weight of the polymer is more preferably greater than about 500,000 and is most preferably greater than about 1,000,000.

To determine the molecular weight of the preferred polymers of this invention, i.e. homopolymers of 2-acrylamido-2-methylpropanesulfonic acid or a salt thereof, the intrinsic viscosity of the polymer can be used in the Mark-Houwink equation:

$$[n] = KM^a$$

wherein [n] is the intrinsic viscosity, M is the molecular weight and K and a are constants for the particular polymer solvent combination. Values of K and a are extensively tabulated in the *Polymer Handbook*, Brandrum and Immergent (1975). Because the values of K and a are not tabulated for poly(2-acrylamido-2-methylpropanesulfonic acid), the values for poly(acrylic acid) are used in the Mark-Houwink equation to determine the molecular weight of the preferred homopolymers useful in this invention.

The preferred means of preparing the polymers useful in this invention is by aqueous redox polymerization which may be affected by standard redox polymerization techniques using standard redox catalysts. Examples of suitable redox catalysts include ammonium bisulfite, ferrous sulfate, hydrogen peroxide, and sodium metabisulfite. It is desirable to exclude oxygen from the reaction vessel as it may inhibit the polymerization process. The temperature of the reaction mixture is not critical but should be maintained between about 2° C. and 60° C. The molecular weight of the homopolymer so obtained will range from about 50,000 to about 5,000,000 as determined by its intrinsic viscosity. Chain transfer agents such as mercaptosuccinic acid may be employed in the polymerization reaction to obtain homopolymers of the desired molecular weight.

The other component of the thickener compositions of this invention is a polyvalent metal cross-linking agent. A polyvalent metal crosslinking agent, as used herein, is defined as any material which will provide polyvalent metal ion to an aqueous composition. As used herein, the term polyvalent metal ion includes polyvalent metal ion complexes, e.g. hydrates, solvates and/or chelates of polyvalent metal ions. The polyvalent metal ions generally have oxidation states of $+3$, $+4$, $+5$ or $+6$. The preferred polyvalent metal ions are aluminum and chromium, each preferably in the $+3$ valence state, and titanium and zirconium, each preferably in the $+4$ valence state.

Examples of materials which will provide the polyvalent metal ions to an aqueous solution are the inorganic salts of the polyvalent metal ions. Examples of suitable salts include aluminum salts such as aluminum trichloride hexahydrate, aluminum sulfate hydrate ($AL_2(SO_4)_3 \cdot 18H_2O$) and zirconium salts such as ammonium zirconium carbonate (available from Magnesium Elektron, Inc. as Bacote 20). Further examples include the organotitanic chelates such as titanium-ammonium lactate chelate and titanium-triethanolamine chelate (each of which is available from E.I. DuPont DeNemours & Company under the trademarks Tyzor® LA and TE, respectively).

The relative proportions of the polymer component to the crosslinking agent component are generally selected such that the weight proportion of polymer to crosslinking agent in the aqueous solution being thickened generally ranges from about 400:1 to about 10:1 by weight polymer to crosslinking agent, more preferably about 200:1 to about 25:1 and most preferably about 100:1 to about 50:1. The optimum proportion of polymer to crosslinking agent will depend upon the identity of the polyvalent metal ion and the nature of the solution to be thickened.

It has been found that the effect of the crosslinking agent on the viscosity of the polymer and aqueous solution is dependent upon the pH of the aqueous solution. The pH of the aqueous solution should therefore be adjusted, prior to the addition of the polyvalent metal crosslinking agent, to a low pH, preferably less than about 4, more preferably less than about 3 and most preferably less than about 2.

If the polymeric component or crosslinking agent will produce an aqueous solution having a pH within these limits, no further steps need to taken to lower the pH of the aqueous solution. For example, the addition of a homopolymer of the of 2-acrylamido-2-methylpropanesulfonic acid to an essentially neutral composition prior to the addition of the crosslinking agent will yield an aqueous solution having a low pH, e.g. less than 3. Similarly, aluminum chloride hexahydrate is an acidic salt which will lower the pH of a neutral aqueous solution sufficient to allow the aluminum contained therein to act as a crosslinking agent. Conversely, however, titanium triethanolamine chelate will raise the pH of an aqueous solution to which it is added such that the pH of the composition to be thickened should be lowered to account for this effect. For example, an acidic agent should be added to the aqueous solution prior to or simultaneously with the addition of the chelate.

The particular agent used to lower the pH of the composition to be thickened is not critical and will, in general, depend upon the desired end use of the aqueous composition. Suitable acidic agents include the mineral acids, e.g. sulfuric, hydrochloric, nitric, etc.

To obtain the maximum viscosity increase, the pH should be raised after the addition of the crosslinking agent and polymer to the aqueous composition to a pH that is substantially neutral, i.e. between about 5 and 9, more preferably between about 6 and 8. If the solution to be thickened is a brine, the pH at which maximum thickening occurs may be below 5. Examples of suitable alkaline materials, i.e. bases, that can be used to raise the pH of the aqueous compositions, include alkali and alkaline earth metal hydroxides and carbonates e.g. sodium hydroxide and/or calcium carbonate, and organic bases such as organic amines.

The two components of the thickener compositions of this invention can be mixed and added to the aqueous composition to be thickened or they may be added sequentially, regardless of which component is added first. When the aqueous composition to be thickened has a pH above about 4, the pH of the aqueous composition should be adjusted before the addition of the polyvalent metal crosslinking agent component.

The amount of the thickener composition of this invention which is added to the aqueous compositions to be thickened will depend upon the viscosity desired of the aqueous composition which will in turn depend upon the ultimate use of the aqueous composition. For example, if the aqueous composition is to be used as a fracturing fluid in the formation fracturing of an oil well, the amount of the thickener solution will range from about 0.05 to about 5% by weight of the fracturing fluid, more preferably from about 0.2% to about 3% and most preferably from about 0.5% to about 2%.

The use of the thickener of this invention is not limited to aqueous compositions used in treating oil wells. Other uses include the transport of suspended particulate solids, e.g. as a thickener for a carbonaceous slurry.

Further, the use of the thickeners of this invention is not limited to simple aqueous solutions. Compositions containing both water and one or more lower alkanols, such as methanol, ethanol, etc., can also be thickened in accordance with this invention. However, the concentration of the lower alkanols in the aqueous composition to be thickened should not be so great that it will reduce the solubility of the polyvalent metal crosslinking agent to such an extent that the amount of polyvalent metal crosslinking agent in solution is insufficient to increase the viscosity of the composition as compared with compositions containing only the polymeric component.

EXAMPLES

Definition-Polymer:

Poly(2-acrylamido-2-methylpropanesulfonic acid) available as Rheothik 80-11 from Henkel Corporation.

Cross-linking Agents:

A: $AlCl_3 \cdot 6H_2O$

B: Triethanolamine chelate titanate available from DuPont as Tyzor® TE

C: Chrome Alum

D: $Al_2(SO_4)_3 \cdot 18H_2O$

E: Ammonium zirconium carbonate available as Bacote 20 from Magnesium Elektron, Inc.

Neutralizing Bases

A: sodium hydroxide
B: ethylenediamine
C: 1,6-hexanediamine
D: ammonium hydroxide
E: calcium carbonate
F: calcium hydroxide

EXAMPLES 1-10

In preparing the aqueous solutions of Examples 1-10, an aqueous solution of polymer was diluted with water to the concentrations shown in Table I. The solution was allowed to equilibrate 25° C. in a water bath and a starting viscosity was taken as the control. The cross-linking agent was then added, either neat or in solution, in an amount sufficient to obtain the concentration of polyvalent metal ion in solution shown in Table I. An amount of the base needed to raise the pH to the level indicated in Table I was then added. A blender was used in most examples to provide sufficient mixing. Viscosities were than taken over time with a Brookfield RVT viscometer at 20 rpm. The highest viscosity achieved over the time period tested is shown for each solution in Table I.

TABLE I

THICKENED WATER SOLUTIONS

| Example | Polymer (wt. %) | Cross-linking Agent | Polyvalent Metal (ppm) | Neutralizing Base | pH | Highest Viscosity (cps) |
|---|---|---|---|---|---|---|
| Control A | 0.5 | none | none | none | 1.5-2.5 | 220 |
| Control B | 1.0 | none | none | none | 1.0-1.5 | 440 |
| 1 | 0.5 | A | 100 | A | 8.76 | 2,000 |
| 2 | 0.5 | A | 100 | B | 7.50 | 1,800 |
| 3 | 0.5 | A | 100 | C | 8.30 | 2,000 |
| 4 | 0.5 | B | 200 | D | 8.02 | 1,540 |
| 5 | 0.5 | B | 200 | A | 8.00 | 1,000 |
| 6 | 1.0 | A | 100 | A | 9.02 | 3,750 |
| 7 | 1.0 | A | 200 | A | 8.55 | 12,000 |
| 8 | 1.0 | A | 300 | A | 8.55 | 17,500 |
| 9 | 1.0 | A | 300 | D | 8.04 | 22,500 |
| 10 | 1.0 | C | 400 | A | 7.75 | 28,000 |

The results of Examples 1-10, shown in Table I, illustrate the great increase in viscosity provided by the addition of a crosslinking agent to a solution of the polymer.

EXAMPLES 11-17

The procedures used in Examples 11-17 were identical to those used for Examples 1-10, with the exception that potassium chloride was present in the diluted solution of polymer in an amount sufficient to obtain the level of potassium chloride shown in Table II.

TABLE II

THICKENED SALT SOLUTIONS

| Example | Polymer (wt. %) | KCl (wt. %) | Crosslinking Agent | Polyvalent Metal (ppm) | Neutralizing Base | pH | Highest Viscosity (cps) |
|---|---|---|---|---|---|---|---|
| Control C | 0.5 | 2 | none | none | none | 1.5-2.5 | 15 |
| Control D | 1.0 | 2 | none | none | none | 1.0-1.5 | 28 |
| 11 | 0.5 | 2 | A | 100 | C | 7.24 | 1,300 |
| 12 | 0.5 | 2 | B | 200 | A | 5.06 | 1,200 |
| 13 | 1.0 | 2 | A | 200 | A | 8.26 | 3,600 |
| 14 | 1.0 | 2 | A | 300 | A | 8.07 | 4,500 |
| 15 | 1.0 | 2 | A | 200 | C | 7.80 | 6,500 |
| 16 | 1.0 | 2 | A | 300 | C | 7.59 | 9,000 |
| 17 | 1.0 | 2 | B | 200 | A | 5.60 | 7,000 |

Examples 11-17, shown in Table II, show that representative thickeners of this invention exhibit an increase in viscosity over the controls even when substantial amounts of an electrolyte are present in the solution.

EXAMPLES 18-20

The procedures used in Examples 18-20 were identical to those used in Examples 11-17, with the exception that the 2% solution of potassium chloride in water was diluted with methanol to form a 70/30 methanol/water solution.

TABLE III

| | | | THICKENED ALCOHOLIC SALT SOLUTIONS | | | | |
|---|---|---|---|---|---|---|---|
| Example | Polymer (wt. %) | KCl (wt. %) | Crosslinking Agent | Polyvalent Metal (ppm) | Neutralizing Base | pH | Highest Viscosity (cps) |
| 18 | 1.0 | 0.6 | A | 50 | D | 8.15 | 1,500 |
| 19 | 1.0 | 0.6 | A | 75 | D | 8.04 | 3,250 |
| 20 | 1.0 | 0.6 | A | 100 | D | 8.45 | 5,500 |

The results of Examples 18–20, shown in Table III illustrate that thickeners of this invention are effective in aqueous alcoholic solutions.

EXAMPLE 21

The procedures of Examples 11–17 were followed in Example 21, with the following exceptions. An amount of poly(ammonium-2-acrylamido-2-methylpropanesulfonate) (prepared by polmerizing a solution of the acid monomer that had been neutralized with ammonium hydroxide and drying the resulting gel) was dry mixed with crosslinking agent D and base E. This dry mixture was added to aqueous potassium chloride, to yield a thickened solution having 1% polymer, 2% potassium chloride, and 300 parts per million polyvalent metal ion. The pH of the solution fell due to the quick dissolution of the homopolymer and the acidic aluminum salt, but then rose to a pH of greater than about 5.2 as the calcium carbonate slowly dissolved. This thickened solution exhibited a highest viscosity of about 18,500 cps. This example shows that an extremely high viscosity can be obtained by using a dry one-package thickener in accordance with this invention in a solution of water and an electrolyte.

EXAMPLES 22–28

The procedures of Examples 11–17 were followed in Examples 22–28, with the exception that sodium chloride and calcium chloride were added to the aqueous solutions in amounts sufficient to obtain a 10% level of sodium chloride and 5,000 parts per million calcium. The pH values shown in Table IV is the pH of the gel when removed from the blender used to mix the components. The final pH may have been higher due to incomplete dissolution of the neutralizing base at the time of removal.

TABLE IV

| | | THICKENED BRINE SOLUTIONS | | | | |
|---|---|---|---|---|---|---|
| Example | Polymer (wt. %) | Crosslinking Agent | Polyvalent Metal (ppm) | Neutralizing Base | pH | Highest Viscosity (cps) |
| 22 | 1 | D | 300 | E | 4.45 | 15,000 |
| 23 | 1 | B | 500 | F | 3.20 | 15,000 |
| 24 | 1.5 | B | 750 | E | 2.70 | 27,500 |
| 25 | 2 | B | 1000 | E | 2.50 | 35,000 |
| 26 | 2.5 | B | 1250 | E | 2.60 | 50,000 |
| 27 | 3 | B | 1500 | E | 2.50 | 62,00 |
| 28 | 1 | E | 1000 | E | 3.75 | 22,500 |

The results of Examples 22–28, shown in Table IV, illustrate that very high viscosities can be imparted to brine solutions by the use of representative thickeners of this invention.

EXAMPLES 29–32

The procedures of Examples 1–10 were followed in Examples 29–32, with the following exceptions. In Examples 29 and 31, Neutralizing Base A was added sequentially to the solution of polymer and crosslinking agent and the solution was allowed to equilibrate after each sequential addition of neutralizing base. The pH and viscosity after each sequential addition were then recorded.

In Examples 30 and 32, an excess of Neutralizing Base A was added to the solution containing only the polymer. The crosslinking agent was then added followed by hydrochloric acid which was added sequentially to lower the pH. The pH and viscosity were measured after each sequential addition of hydrochloric acid.

The crosslinking agent of Examples 29 and 30 was 150 parts per million Crosslinking Agent D, and the crosslinking agent of Examples 31 and 32 was 250 parts per million Crosslinking Agent B. The results from these four examples are shown in Table IV.

TABLE V

| | EFFECT OF pH ON REPRESENTATIVE THICKENERS | | | | | | | |
|---|---|---|---|---|---|---|---|---|
| Example | pH/Viscosity (cps) | | | | | | | |
| 29 | 2.15/215[1] | 2.02/17[2] | 3.74/20 | 5.06/26 | 6.43/38 | 7.36/44 | 8.25/6000 | (9,500 overnight) |
| 30 | 2.08/215[3] | 12.10/29[4] | 11.66/29[5] | 9.53/33 | 8.83/96 | (Hazy) | | |
| 31 | 2.28/200[1] | 2.32/151[2] | 3.05/193 | 4.03/202 | 4.91/206 | 6.03/227 | 6.92/2000 | (3,000 in 2 hrs.) |
| 32 | 2.70/215[3] | 11.15/55[4] | 11.17/57[5] | 9.55/57 | 8.03/51 | 6.92/50 | (Cloudy) | |

[1] Before metal ion addition
[2] After metal ion addition
[3] Before NaOH addition
[4] After NaOH addition
[5] After metal ion addition The results of Examples 29–32, shown in Table IV, illustrate that the thickeners of the present invention are pH sensitive, i.e. that the pH of aqueous compositions containing the thickeners of this invention should be lowered prior to addition of the crosslinking agent and raised after the addition of the crosslinking agent. The reason for this sensitivity is not fully understood. This sensitivity may be due to precipitation of the polyvalent metal ion as a hydroxide, however, this does not fully explain the failure of the lowering of the pH to reactivate the thickener.

What is claimed is:

1. A thickened aqueous composition having a pH of between about 5 and about 9 comprising:

(a) a thickening amount of a homopolymer having a molecular weight of about 50,000 to about 5,000,000 and having as the recurring structural unit:

—[CH$_2$—CH(C(O)NH—R—SO$_3$M)]— wherein R is a divalent hydrocarbon radical and M is a hydrogen atom, an ammonium group, or an alkali metal; and
(b) a polyvalent metal cross-linking agent comprised of a metal in the +3, +4, +5 or +6 oxidation state at a concentration sufficient to increase the viscosity of the aqueous composition; and
(c) water,
wherein the relative proportions by weight of the polymer to the polyvalent metal cross-linking agent, is in the range of from about 400:1 to about 10:1.

2. A composition in accordance with claim 1 further comprising a lower alkanol.

3. A composition in accordance with claim 1 further comprising an electrolytic salt wherein the total concentration of electrolytic salts is in excess of 0.5% by weight of the aqueous composition.

4. A composition in accordance with claim 3 wherein the concentration of electrolytic salts is greater than 5% by weight of the aqueous composition.

5. A composition in accordance with claim 1 wherein the polyvalent metal crosslinking agent is a salt of aluminum, titanium, chromium or zirconium.

6. A composition in accordance with claim 5 wherein the polyvalent metal crosslinking agent is comprised of Al(III), Ti(IV), Cr(III) or Zr(IV).

7. A composition in accordance with claim 1 wherein R is an alkylene or alkenylene group.

8. A composition in accordance with claim 7 wherein R is a 2-(N-substituted)-2-methyl-propyl group.

9. A composition in accordance with claim 8 wherein M is an ammonium group, or an alkali metal atom.

10. A composition in accordance with claim 8 wherein M is a hydrogen atom.

11. A composition in accordance with claim 10 further comprising an alkaline material.

12. A composition in accordance with claim 11 wherein the alkaline material is calcium hydroxide or carbonate.

13. A method of thickening an aqueous composition comprising adding a thickener composition to an aqueous composition in an amount sufficient to thicken the composition and lower the pH to below about 4 and then raising the pH to between about 5 and about 9, said thickener composition comprising:
(a) a homopolymer having as the recurring structural unit:

—[CH$_2$—CH(C(O)NH—R—SO$_3$M)]— wherein R is a divalent hydrocarbon radical and M is a hydrogen atom, an ammonium group, or an alkali metal atom; and
(b) a polyvalent metal cross-linking agent
wherein said homopolymer has a molecular weight between about 50,000 and about 5,000,000 and the relative proportion of the homopolymer to the polyvalent metal cross-linking agent, is in the range of from about 400:1 to about 10:1 by weight polymer to cross-linking agent and wherein the polyvalent metal cross-linking agent is a salt of aluminum, titanium, chromium, or zirconium.

14. A method as described in claim 13 wherein the aqueous composition to which the thickener is added also contains a lower alkanol.

15. A method as described in claim 14 wherein the lower alkanol is selected from the group consisting of: methanol, ethanol, m-propanol, and isopropanol.

16. A method of thickening an aqueous composition comprising adding a thickener composition to an aqueous-composition having a pH below about 4 in an amount sufficient to thicken said aqueous composition and then raising the pH to between about 5 and about 9, wherein said thickener composition comprises
(a) a homopolymer having as the recurring structural unit:

—[CH$_2$—CH(C(O)NH—R—SO$_3$M)]— wherein R is a divalent hydrocarbon radical and M is a hydrogen atom, and
(b) a polyvalent metal cross-linking agent; and
(c) an alkaline material
wherein R is a 2-(N-substituted)-2-methylpropyl group, said alkaline material is calcium hydroxide or carbonate, and wherein the homopolymer has a molecular weight in the range of from about 50,000 and about 5,000,000; the polyvalent metal cross-linking agent is selected from the group consisting of: aluminum, titanium, chromium, and zirconium; and the relative proportions of the polymer to the polyvalent metal cross-linking agent is in the range of from about 400:1 to about 10:1 by weight polymer to cross-linking agent.

17. A method as described in claim 16 wherein the aqueous composition to which the thickener is added also contains a lower alkanol.

18. A method of thickening an aqueous composition comprising:
(a) adding to an aqueous composition to be thickened a homopolymer having a molecular weight in the range of from about 50,000 and about 5,000,000 and having as the recurring structural unit:

—[CH$_2$—CH(C(O)NH—R—SO$_3$M)]— wherein R is a divalent hydrocarbon radical and M is a hydrogen atom in an amount sufficient to both thicken the aqueous composition and lower the pH of the composition below about 4;
(b) adding to the aqueous composition, at a time when the pH of the composition is below about 4, a viscosity increasing amount of a polyvalent metal cross-linking agent, and
(c) lastly, adjusting the pH of the aqueous solution to between about 5 and about 9
wherein the the polyvalent metal cross-linking agent is selected from the group consisting of: aluminum, titanium, chromium, and zirconium;
and the relative proportions of the polymer to the polvalent metal cross-linking agent is in the range of from about 400:1 to about 10:1 by weight polymer to cross-linking agent.

19. A method of thickening an aqueous composition comprising:
(a) adding to an aqueous composition a thickening amount of a homopolymer having a molecular weight in the range of from about 50,000 to about 5,000,000 and having as the recurring structural unit:

—[CH$_2$—CH(C(O)NH—R—SO$_3$M)]— wherein R is a divalent hydrocarbon radical and M is an ammonium group, or an alkali metal atom; then
(b) adjusting the pH of the aqueous composition to below about 4 and then adding to the aqueous composition a viscosity increasing amount of a polyvalent metal cross-linking agent selected from the group consisting of: aluminum, titanium, chromium, and zirconium; and the relative proportions of the homopolymer to the polyvalent metal cross-linking agent is in the range of from about 400:1 to about 10:1 by weight polymer to cross-linking agent and
(c) lastly, raising the pH to between about 5 and about 9.

* * * * *